US011164209B2

United States Patent
Avegliano et al.

(10) Patent No.: US 11,164,209 B2
(45) Date of Patent: Nov. 2, 2021

(54) PROCESSING IMAGE USING NARROWED SEARCH SPACE BASED ON TEXTUAL CONTEXT TO DETECT ITEMS IN THE IMAGE

(71) Applicant: International Business Machines Corporation, Armonk, NY (US)

(72) Inventors: Priscilla B. Avegliano, Sao Paulo (BR); Andrea Britto Mattos Lima, Sao Paulo (BR); Vagner F. D. Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 15/818,888

(22) Filed: Nov. 21, 2017

(65) Prior Publication Data

US 2018/0308126 A1    Oct. 25, 2018

Related U.S. Application Data

(63) Continuation of application No. 15/493,838, filed on Apr. 21, 2017.

(51) Int. Cl.
*G06Q 30/02* (2012.01)
*G06Q 50/00* (2012.01)
*G06F 16/583* (2019.01)

(52) U.S. Cl.
CPC ..... *G06Q 30/0255* (2013.01); *G06F 16/5846* (2019.01); *G06Q 50/01* (2013.01)

(58) Field of Classification Search
CPC . G06Q 30/0255; G06Q 50/01; G06F 16/5846
See application file for complete search history.

(56) References Cited

U.S. PATENT DOCUMENTS

| 7,720,835 | B2 | 5/2010 | Ward et al. |
| 8,826,150 | B1 | 9/2014 | Ainslie |
| 10,311,288 | B1 | 6/2019 | Dandekar et al. |
| 2009/0319342 | A1 | 12/2009 | Shilman et al. |
| 2010/0114899 | A1 | 5/2010 | Guha et al. |

(Continued)

OTHER PUBLICATIONS

McAuley, J. et al., "Image Labeling on a Network Using Social-Network Metadata for Image Classification", http://cs.stanford.edu/people/jure/pubs/image-eccv12.pdf, downloaded on Apr. 21, 2015, pp. 1-14.

(Continued)

*Primary Examiner* — Aleksandr Kerzhner
*Assistant Examiner* — Aryan D Toughiry
(74) *Attorney, Agent, or Firm* — Scully, Scott, Murphy & Presser, P.C.; Joseph Petrokaitis

(57) ABSTRACT

The present disclosure describes systems and methods for identifying products that are implicitly published in an image, e.g., where there is no identifying text or comments that identify the brand of the product. A product entity may be identified based on comments posted in response to the posting of the image. An analysis of the image may be performed based on the identified product entity to find items or products of a type of the identified product entity in the image. A product detected in the image may be compared to a database of products of the type of product entity to determine which product was posted in the image.

7 Claims, 9 Drawing Sheets

(56) References Cited

U.S. PATENT DOCUMENTS

| | | |
|---|---|---|
| 2011/0153451 A1 | 6/2011 | Bitz et al. |
| 2011/0255736 A1 | 10/2011 | Thompson et al. |
| 2011/0282860 A1 | 11/2011 | Baarman et al. |
| 2012/0101808 A1 | 4/2012 | Duong-Van |
| 2013/0073473 A1 | 3/2013 | Heath |
| 2013/0103667 A1 | 4/2013 | Minh |
| 2013/0311485 A1 | 11/2013 | Khan |
| 2014/0019264 A1 | 1/2014 | Wachman et al. |
| 2014/0101691 A1 | 4/2014 | Sinha et al. |
| 2014/0270407 A1 | 9/2014 | Balakrishnan et al. |
| 2014/0279068 A1 | 9/2014 | Systrom et al. |
| 2014/0337328 A1 | 11/2014 | Sarvabhotla et al. |
| 2015/0149153 A1* | 5/2015 | Werth .................. G06F 40/30 704/9 |
| 2015/0186420 A1 | 7/2015 | Yan et al. |
| 2016/0140627 A1* | 5/2016 | Moreau .............. G06Q 30/0282 705/7.32 |
| 2016/0343004 A1* | 11/2016 | Brink ................. G06Q 30/0201 |
| 2017/0308985 A1* | 10/2017 | Grom ..................... G06Q 50/18 |
| 2018/0005088 A1* | 1/2018 | Farfade ................ G06K 9/6224 |
| 2018/0083901 A1* | 3/2018 | Mcgregor, Jr. ........ G06K 9/726 |
| 2018/0121830 A1* | 5/2018 | Schmid ................. G06N 20/00 |
| 2018/0302682 A1* | 10/2018 | Saxena ................. G06Q 50/01 |

OTHER PUBLICATIONS

Johnson, J. et al., "Love thy Neighbors: Image Annotation by Exploiting Image Metadata", http://arxiv.org/pdf/1508.07647v2.pdf, Sep. 22, 2015, pp. 1-9.

List of IBM Patents or Patent Applications Treated as Related, dated Nov. 21, 2017, 2 pages.

Office Action dated Apr. 15, 2019 received in U.S. Appl. No. 15/493,838, 36 pages.

Office Action dated Apr. 13, 2020 received in parent U.S. Appl. No. 15/493,838, 30 pages.

* cited by examiner

PROCESSING IMAGE USING NARROWED SEARCH SPACE BASED ON TEXTUAL CONTEXT TO DETECT ITEMS IN THE IMAGE

CROSS-REFERENCE TO RELATED APPLICATIONS

This application is a continuation of U.S. patent application Ser. No. 15/493,838 filed Apr. 21, 2017 which is incorporated by reference herein in its entirety.

BACKGROUND

The present disclosure relates to the processing of images using narrowed search space based on textual context to detect items in the image.

Information posted by users to web sites or social media are often analyzed to determine the content and context of the posts. Web crawlers or other similar systems are used for data collection, tracking, and analysis of the content posted by users. In some cases, textual content may be analyzed to determine the topic, sentiment, or other similar features of a post. Image content may also be analyzed in an attempt to recognize the content or topic of the image, apply tags to identified individuals in the image, label the image into a category, annotate the image, or take other similar actions.

BRIEF SUMMARY

In an aspect of the present disclosure, a method for identifying products that are implicitly published in an image, e.g., where there is no identifying text or comments that identify the brand of the product, is disclosed. The method includes receiving social network data from at least one social network. The social network data may include at least one post by a user of the at least one social network. The method further includes determining that the at least one post by the user includes an image. In response to determining that the at least one post by the user includes an image, the method further includes retrieving, from the social network data, at least one comment posted in response to the at least one post by the user. The method further includes processing text of the at least one comment to determine whether the text contains a reference to a product entity and determining, based on the processing, that the text contains a reference to a product entity. The method further includes identifying a type of the product entity referenced by the text and analyzing the image based on the identified type of the product entity. The method further includes determining that an image of a product of the identified type is present in the image based on the analysis of the image and comparing the image of the product of the identified type to a plurality of images of products stored in a products database. The method further includes determining, based on a result of the comparison, that the image of the product of the identified type corresponds to one of the plurality of images of products stored in the products database and identifying the product based on the determination that the image of the product of the identified type corresponds to one of the plurality of images of products stored in the products database. The method further includes storing the identification of the product in a results database.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
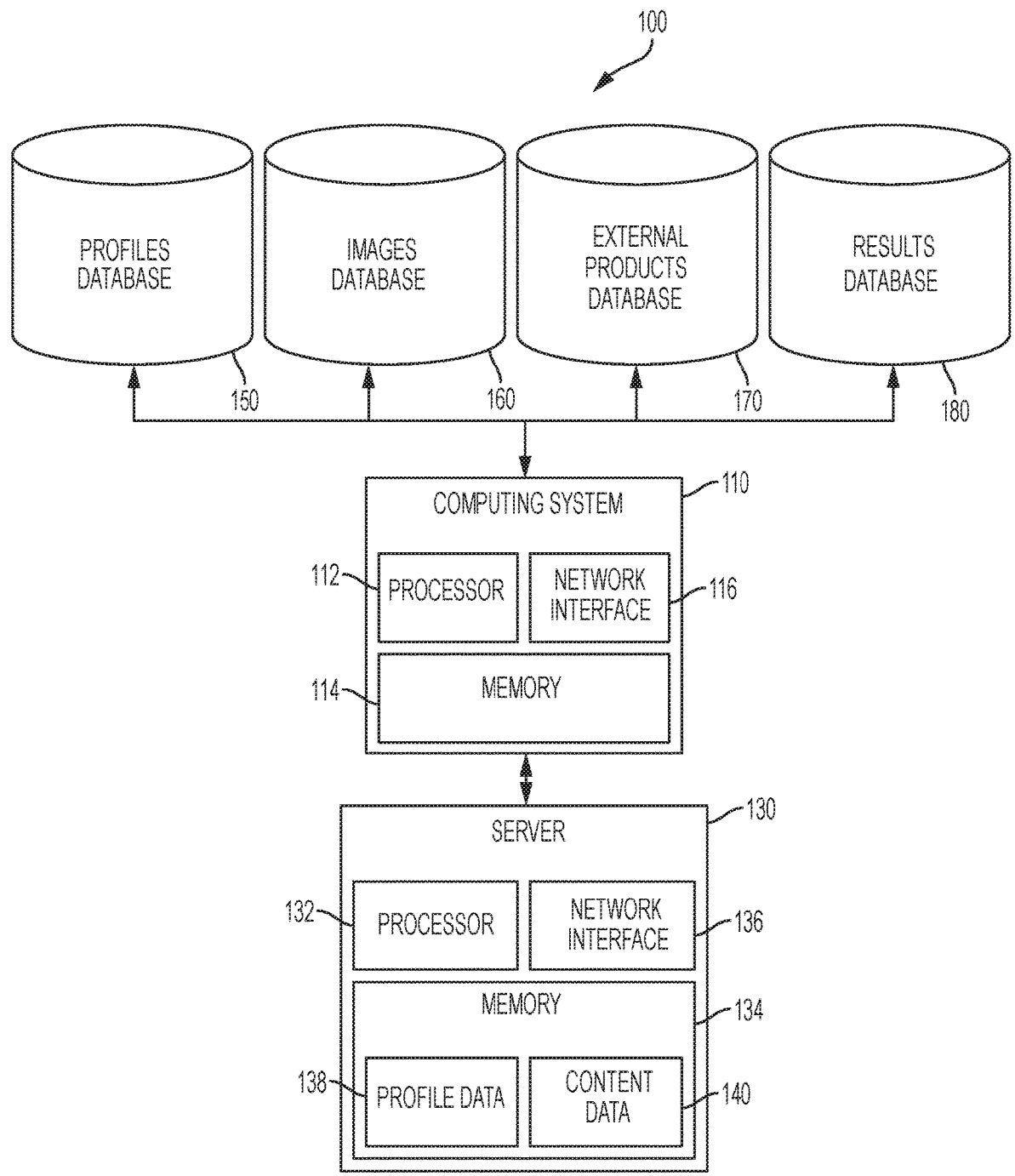
FIG. 1 is a system diagram in accordance with an aspect of the present disclosure.

A variety of methods may be employed to monitor content that is posted on-line by users. One common method includes monitoring user content posted on a product page for a particular product. For example, e-commerce websites often provide users with the ability to post comments or reviews on the product pages associated with each product. System administrators or the like, for example, for a retailer organization, may monitor the content associated with products by retrieving each product page according to the product identifier (e.g., name+brand+model), and by analyzing the corresponding content by users for that product, e.g., reviews, comments, or other similar content. In some aspects, for example, a computing device, server, or other system may be employed to automatically perform the monitoring using web crawlers or other similar tools.

Simply monitoring content on product pages, however, may not provide the system administrator with a full understanding of the user sentiment for their product. For example, the system administrator may not able to obtain any additional information about the demographics of the users. This may be because the only available information on the user post or user profile for the product page is often only a name. In some cases, the name may not even be the user's real name. For example, the name field may be filled in with nicknames or fake names or even listed as anonymous. If the system administrator had access to additional user information for the users that are publishing positive or negative content about the product, e.g., demographics, location, etc., the system administrator would be able to improve the advertisement strategies or products based on that additional user information.

Another drawback to simply monitoring content on product pages is that the system administrator may not be able to monitor the positive or negative content posted in reaction to products that are publicized implicitly on websites or social networks. For example, if an image of the product is published in a post on social media, but the name or brand of the product is not identified in any text or comments associated with the post, or no text is posted with the image, the monitoring of any user sentiment posted in response to the publishing of the product in the image may be inhibited.

In an aspect, the present disclosure describes systems and methods for identifying products that are implicitly published in an image, e.g., where there is no identifying text or comments that identify the product or brand of the product, and monitoring user sentiment posted in response to the implicit publishing of the product in the image, e.g., "beautiful dress!"

In some aspects, for example, the disclosed systems and methods may identify a product entity, e.g., dress, watch, etc., based on comments posted in response to the posting of the image. An analysis of the image may be performed based on the identified product entity to find items or products of the identified product entity type in the image, e.g., only analyze the image for "dresses". By reducing the required analysis of the image to only items or products of the identified product entity type, the search space required for analyzing the image is narrowed which reduces the computing overhead associated with analyzing the image. In addition, the narrowed search space allows any items or products of the product entity type that are detected in the image by the analysis to be quickly searched against only product or item databases of the identified product entity type, thereby reducing the amount of additional processing required to identify the brand of the item or product in the image. By narrowing the search space the systems and methods of the present disclosure have improved solution scalability over systems which analyze an image for every potential product that may be present.

With reference now to FIG. 1, a system 100 for monitoring implicit publishing of products on websites or social networks is illustrated. In some aspects, system 100 includes a computing system 110, a server 130, a profiles database 150, an images database 160, an external products database 170, and a results database 180.

Computing system 110 includes at least one processor 112, memory 114, at least one network interface 116, and may include any other features commonly found in a computing system. In some aspects, computing system 110 may, for example, include a single computing device, a plurality of computing devices, a server, a server farm, a big data analytics engine, or any other device or system that is configured to monitor user sentiment posted in response to the implicit publishing of a product in an image.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from server 130, profiles database 150, images database 160, external products database 170, results database 180, or any other computing device or database via wired or wireless connections. For example, network interface 116 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing system 110 to transmit or receive information to or from server 130, profiles database 150, images database 160, external products database 170, and results database 180.

Server 130 may include at least one processor 132, memory 134, and a network interface 136 that may include similar functionality as processor 112, memory 114, and network interface 116. In some aspects, server 130 may, for example, be any computing device, server, server array, or similar system that is configured to implement, run, or execute a social network that allows users to interact socially, post information, post reviews, discuss products, or perform any other social interaction that may be monitored or tracked by computing system 110. In some aspects, server 130 may implement, run, or execute all or a part of a web page, a social media site, a communications site, a mobile phone application, a blog website, a forum, a text messaging service, or any other similar social medium in which users may post an image of a product or provide comments or reviews or other content in response to a posted image of a product. Non-limiting examples of a social network that may be executed on or implemented by a server 130 may include, for example, Facebook®, Twitter®, Instragram®, Snapchat®, Youtube®, Flickr®, Pinterest®, or other similar social media sites, applications, tools, or systems that provide users with the capability to post of images and comments.

In some aspects, memory 138 of server 130 may include profile data 138 and content data 140.

Profile data 138 may include a variety of information about each user that posts content to the social network or has a registered account with the social network including, for example, demographic information, location, or other similar profile related information about the user.

Content data 140 may include, for example, any content posted by users to a social network including, e.g., image content, textual content, or other similar data.

Profiles database 150 may store data about user profiles. In some aspects, profiles database 150 may be included as part of server 130 and may store the user profile data 138. For example, profiles database 150 may be accessible by computing system 110 to retrieve user profile data 138 for users of a social network from server 130. In some aspects, profiles database 150 may be separate from server 130 and computing system 110 gather user profile data 138 from server 130 and store the gathered user profiles 138 in profiles database 150 for later use.

Figure 3:
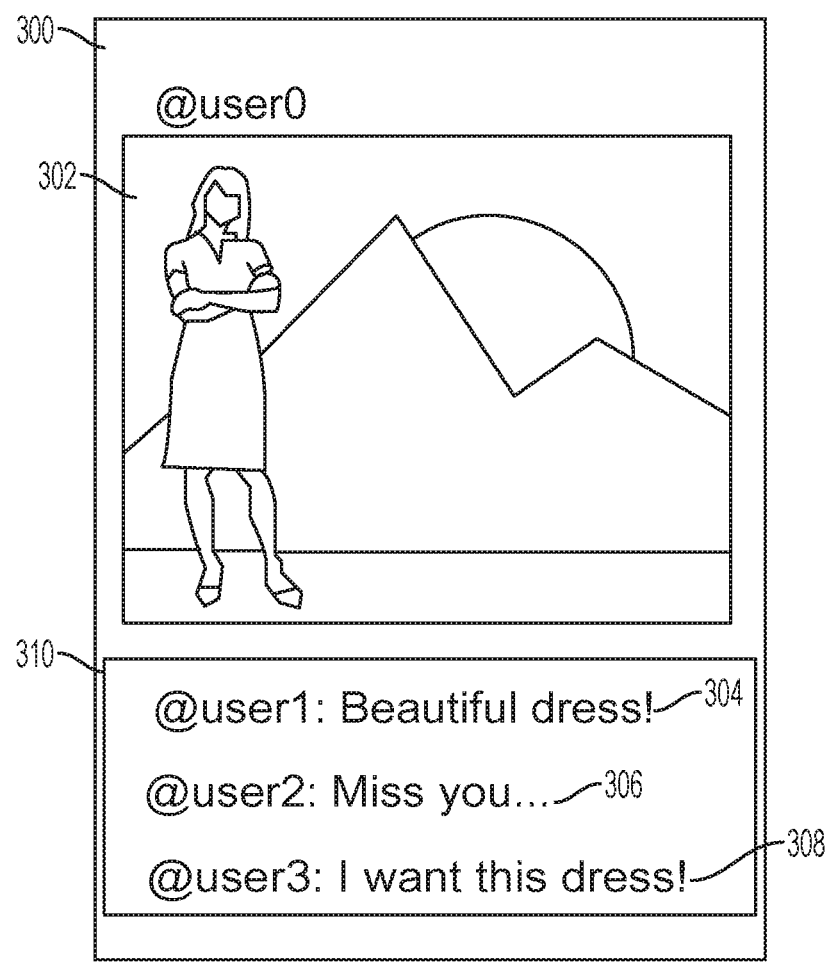
FIG. 3 is an illustration of a post made by a user of a social network in accordance with an aspect of the present disclosure.
Figure 4:
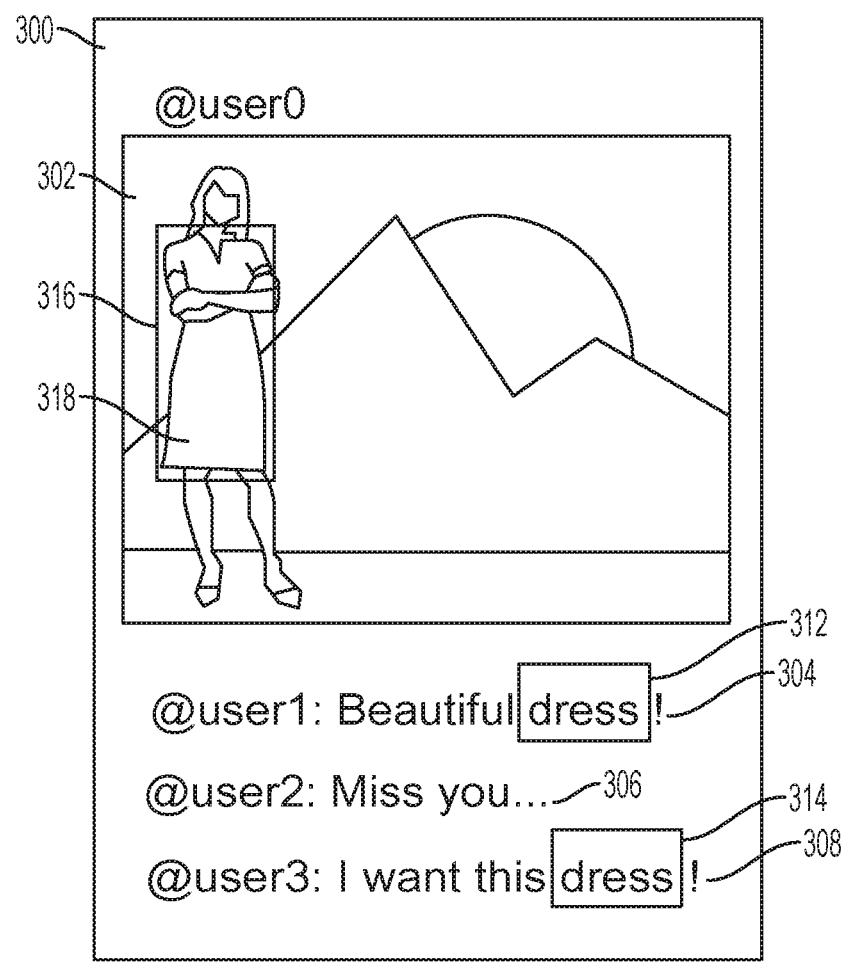
FIG. 4 is an illustration of the post of FIG. 3, showing an analysis of the text of comments of the post to determine a product entity in the text in accordance with an aspect of the present disclosure.

Images database 160 may store image processing criteria for each type of product entity that may be used to detect products of that type of product entity in an image 302 (FIG. 3). For example, images database 160 may include image processing criteria for product entities such as, e.g., dresses, watches, scarves, etc., that define and focus the image processing to detect a product to a particular portion of an image. For example, if the product entity is "watch", the image processing criteria stored in images database 160 may indicate that computing system 110 should look for the watch in a specific portion of the image, e.g., on an arm of a person in the image, or other similar image processing criteria.

External products database 170 may include product images of products, e.g., products associated with one or more retailers, that may be compared to product images identified in an image published in a social media post to determine an identity of the product in the image. In some aspects, external products database 170 may store product images under a variety of categories to assist in searchability. For example, external products database 170 may store product images as based on a retail category of the product, e.g., apparel, electronics, etc., may store images based on a type of product entity within the category, e.g., dresses, shirts, pants, hats, scarves, shoes, etc., or in any other manner. In some aspects, for example, each product image stored in external products database 170 may be annotated with retailer information about the product, for example, brand, name, model number, pricing information, or any other information about the product.

Results database 180 may store results data generated by computing system 110 for each product identified in an image posted by a user to a social network. Results data may include, for example, an identified product, a determined sentiment for that product by a user, and profile information for that user such as demographics, or other similar information.

The monitoring of user sentiment posted in response to the implicit publishing of a product in an image will now be described with reference to FIGS. 2-7.

Figure 2:
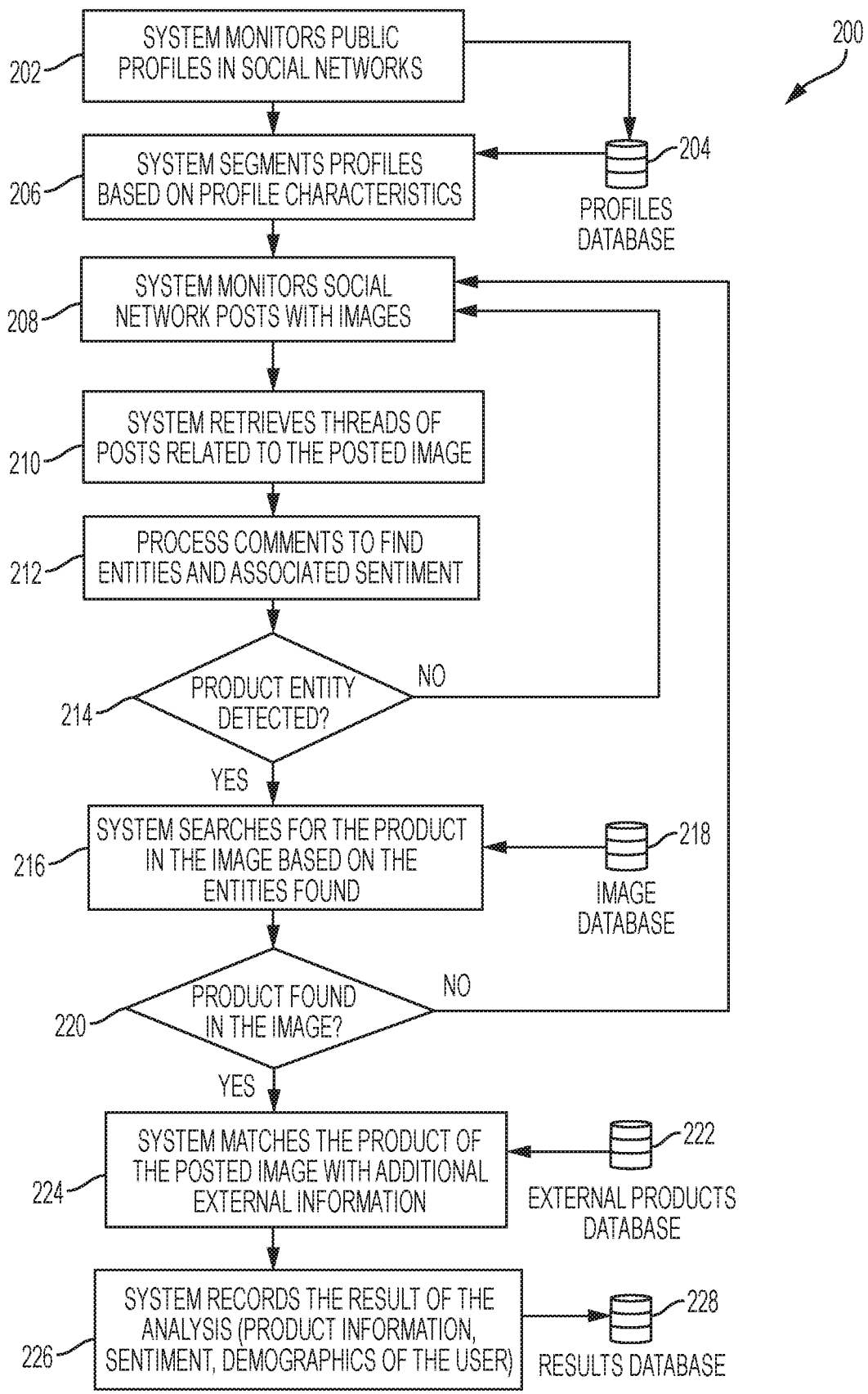
FIG. 2 is a flow chart of a method implemented by the system of FIG. 1 in accordance with an aspect of the present disclosure.

With reference to FIG. 2, a method 200 of identifying a product published intrinsically in an image in social media or website posts and monitoring user sentiment associated with the product published intrinsically in the image will now be described.

At 202, computing system 110 monitors the public profiles of users of a social network. For example, computing system 110 may receive profile data 138 from server 130 at 204 and may segment the received profile data based on profile characteristics, e.g., demographics or other profile information, at 206.

At 208, computing system 110 monitors the posts made by users to the social network for posts that contain the publication of an image. For example, computing system 110 may receive content data 140 from server 130, e.g., via network interfaces 116 and 136, and may analyze the content data 140 to determine whether a user has published an image in a post to the social network. With reference to FIG. 2, for example, a social media post 300 is illustrated in which a @user0 has posted an image 302. For example, computing system 110 may determine that a post 300 includes an image 302 posted by a user @user0.

With continued reference to FIGS. 2 and 3, at 210, in response to determining that a post 300 includes an image 302, computing system 110 retrieves the threads of comments 310 related to the posted image from server 130. For example, computing system 110 may retrieve a comment 304 of "beautiful dress!" posted by @user1 in response to the post of image 302 by @user0, may retrieve a comment 306 of "Miss you . . . " posted by @user2 in response to the post of image 302 by @user0, and may retrieve a comment 308 of "I want this dress!" posted by @user3 in response to the post of image 302 by @user0.

At 212, computing system 110 analyzes the retrieved comments 304, 306, and 308 to determine if there are any product entities mentioned by the comments, for example, using natural language processing to identify a comment's relative clauses referring to the product. For example, as illustrated in FIG. 3, computing system 110 may analyze the comment 304 and determine that comment 304 mentions a product entity "dress". As another example, computing system 110 may analyze comment 306 and determine that no product entity is mentioned. As another example, computing system 110 may analyze comment 308 and determine that comment 308 also mentions the product entity "dress". In some aspects, for example, a database of product entity types, e.g., images database 160, may include text corresponding to a plurality of product entity types that may be compared to the text of the comments 304, 306, and 308 to determine whether the text includes a reference to a product entity.

Based on the analysis of comments 304, 306, and 308, computing system 110 may identify a type of product entity "dress" as a product entity to be detected in the image 302. The detection of a product entity from the comments 310 allows computing system 110 to narrow the search space and perform a targeted search for only products of the identified product entity in image 302. By narrowing the search space, computing system 110 may have improved solution scalability over systems which analyze an image for any potential product that may be present.

Figure 5:
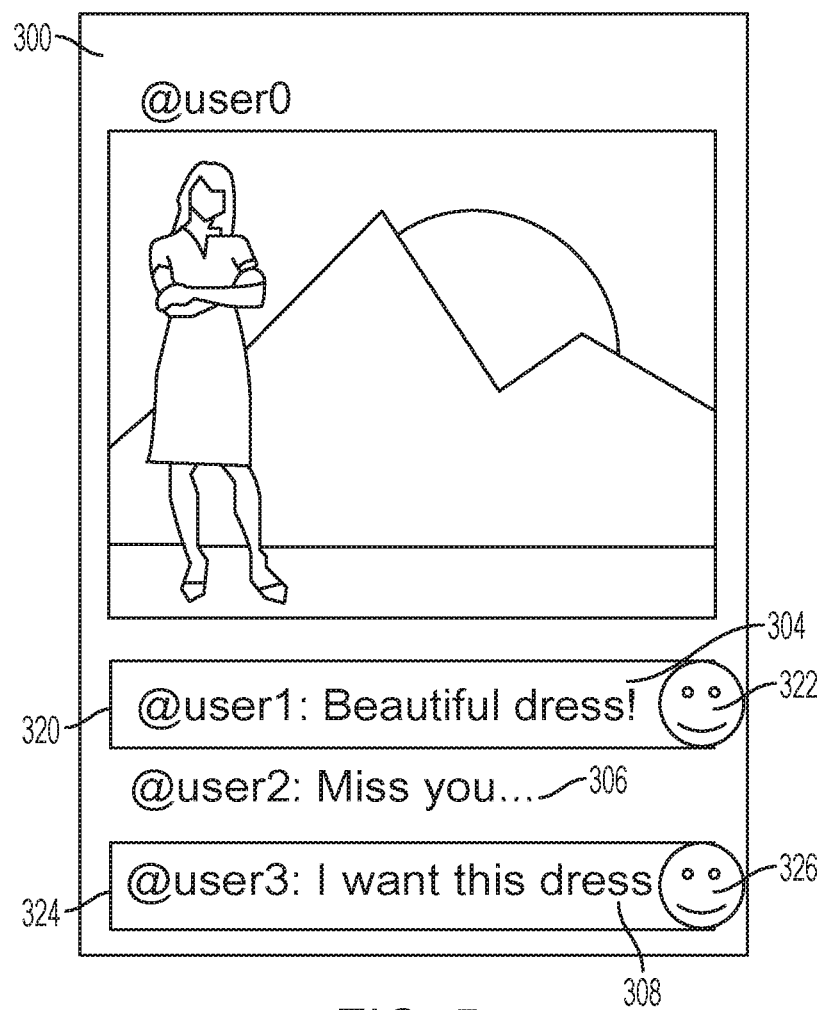
FIG. 5 is an illustration of the post of FIG. 3, showing an analysis of the text of the comments in accordance with an aspect of the present disclosure.

In some aspects, with reference to FIG. 5, computing system 110 may also analyze a sentiment of comments 304, 306, and 306 at 212. For example, computing system 110 may apply natural language processing or other similar methods to determine a sentiment of each comment 304, 306, and 308 with respect to the product in the image 302. In some aspects, for example, only those comments that mentioned a product entity may be analyzed for user sentiment. For example, as illustrated in FIG. 5, comment 304 is identified as a sentiment comment 320 due to the presence of the product entity "dress". Sentiment analysis may be performed on comment 304 to determine that @user1 has a positive sentiment 322, e.g., as identified by a smiley face. For example, the sentiment of @user1 may be based on the use of the term "beautiful" in conjunction with the identified product entity "dress" Likewise, comment 308 may also be identified as a sentiment comment 324 due to the presence of product entity "dress". Sentiment analysis may be performed on comment 308 to determine that @user3 has a positive sentiment 326, e.g., as identified by a smiley face. In some aspects, for example, sentiment analysis algorithms may rely on a training database with texts annotated with a positive or negative label. A classifier may be trained with the labeled texts. Example classifiers for this task may include but are not limited to SVM (Support Vector Machines), Naïve Bayes, and Neural Networks.

With reference again to FIG. 2, at 214, if no product entity is detected, the method returns to 208 and continues monitoring the content data 140 of server 130 for posts that include images. If a product entity is detected, the method proceeds to 216.

At 216, computing device 110 analyzes image 302, for example using image processing, to detect a product of the identified type of product entity. For example, computing device 110 may identify a target region 316 based on the type of the product entity mentioned in comments 304 and 306, e.g., a product entity of type "dress," and identify the product 318 within image 302 within the region 316. In some aspects, for example, a feature-based method of recognizing a product of the identified type in the image 302 may be used.

In some aspects, for example, computing device 110 may access images database 160 to determine the locations within the image 302 to be searched for products of the identified type of product entity, e.g., dress. For example, images database 160 may contain image processing criteria for each type of product entity that may be used to detect products of that type of product entity in an image 302. For example, if the product entity is a "watch", images database 160 may contain image processing criteria for "watches" that indicates that computing device 110 should search for a watch product on the wrist of a person in the image 302. Likewise, where the product entity is a "dress", images database 160 may contain image processing criteria for "dresses" that indicates that the computing device 110 should search for the a dress product between the neck and knees (or ankles) of a person in the image. In some aspects, for example, the image processing criteria for each type of product entity may define a target region in the image, e.g., target region 316 for searching for product entities of the type "dress".

In some aspects, for example, a pre-defined set of images of products of the product entity type may be stored in images database 160 and features may be extracted from the set of images using a descriptor such as, e.g., a Scale-Invariant Feature Transform (SIFT) descriptor, a Speeded-Up Robust Features (SURF) descriptor, or any other descriptor. In some aspects, for example, the product entity may be detected using Fully Convolutional Networks. The image 302 may then be processed by parts, e.g., features may be computed (in each part) and matched with the extracted features for the product entity.

In some aspects, the disclosed use of comments 310 to identify a target type of product entity provides additional efficiencies over simply processing an image to identify any products that may be present. For example, the larger the number of objects that must be located, the larger the number of operations that must be performed on the image. For example, if during generic processing of an image, several objects have been recognized, computing system 110 would need to then match several different features to products when attempting to determine which product the user sentiment is directed toward. This process is much more computationally expensive that matching a single or select group of objects. By inferring a target product entity based on the textual comments, the processing on the image by computing system 110 may be targeted to only detecting products of the target product entity type, which can save a substantial amount of processing time and provide a scalable solution. In the provided examples of FIGS. 3-7, computing system 110 only has to match features from dresses, and can ignore any other products that may be present within image 302 such as skirts, watches, etc.

With reference again to FIG. 2, at 220, computing device 110 determines whether a product of the identified type of product entity, e.g., "dress", has been found within image 302, e.g., a product 318. If no product has been found in the image 302, the method returns to 208 and continues to monitor posts on the social network for posts with an image. If a product has been found in the image, the method proceeds to 224.

Figure 6:
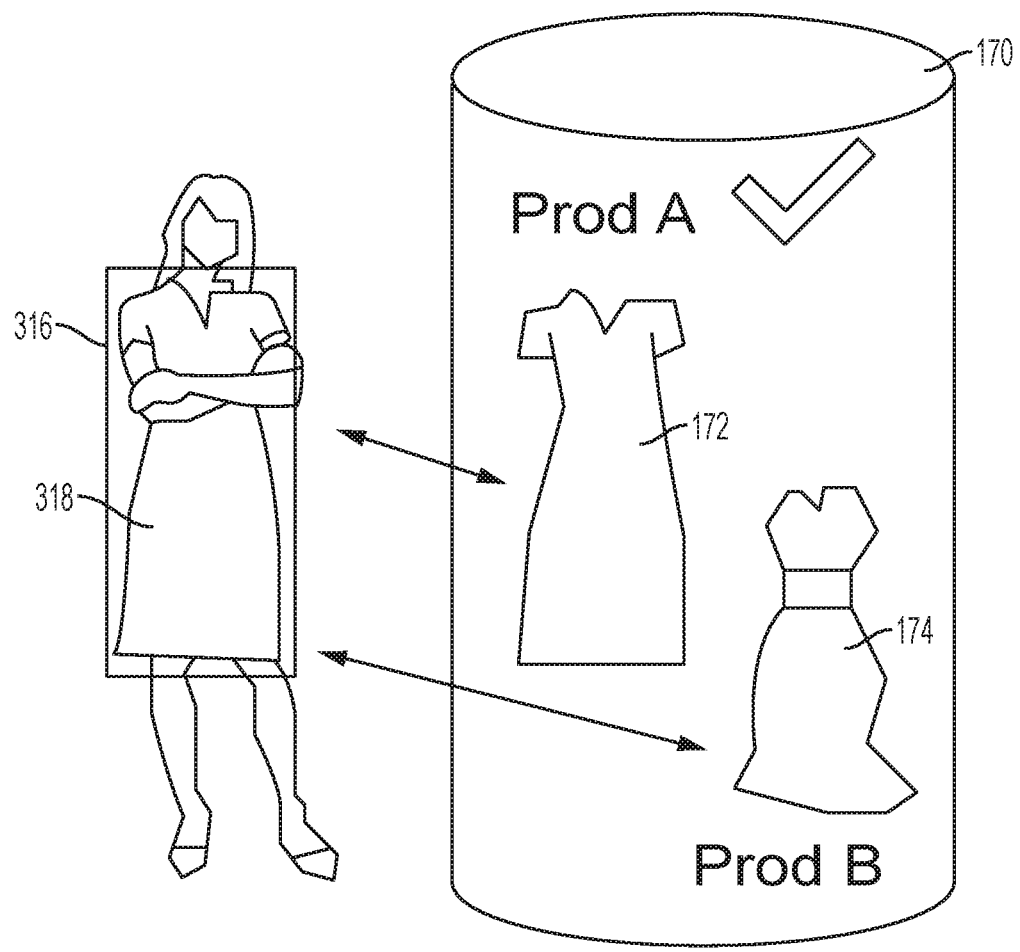
FIG. 6 is an illustration of a comparison of a product entity of the post of FIG. 3 being compared to a database of product images in accordance with an aspect of the present disclosure.

At 224, computing system 110 compares the identified product 318 to products in found in external products database 170, as illustrated, for example, in FIG. 6. For example, computing device 110 may retrieve images of products for comparison to product 318 from external products database 170 at 222. In some aspects, computing device 110 may alternatively access external products database 170 and review the images of the products for comparison on external products database 170.

External products database 170 may include images of products that may be used for comparison to a product 318 identified by computing system 110. For example, external products database 170 may include images of products of any type of product entity, e.g., dresses, watches, scarves, hats, shirts, etc. In some aspects, for example, external products database 170 may categorize the images of the products based on type of product entity to allow for faster comparison by computing system 110 to an identified product of the same product entity. For example, external products database 170 may include images of product A (identified as 172) and product B (identified as 174) for comparison to identified products of the product entity type "dress". As illustrated in FIG. 6, for example, a comparison of product 318 to products A (172) and B (174), e.g., using image processing techniques, may identify product 318 as product A (172).

In some aspects, for example, matching an image of a product (previously detected from the posted image) to images of external products database 170 may be an application of the image classification problem. In this problem, computing system 110 may assign a class for the image 302 by comparing it to a set of training images. Example classifiers that may be used may include, for example, a k-Nearest Neighbors (k-NN) algorithm, a support Vector Machine (SVM), deep convolutional neural networks, or other similar tools that may be used to classify, train, and compare the input images. Under a certain product entity (e.g., watch), several images of watches may be stored in the training set. Each class represents a watch from a certain brand and model, and several images of watches from each class (under different orientation, illumination conditions, etc.) may be stored in the training database. For example, computing system 110 may access a "dress" database containing training images of each dress that may be matched to the "dress" detected in the image 302.

Figure 7:
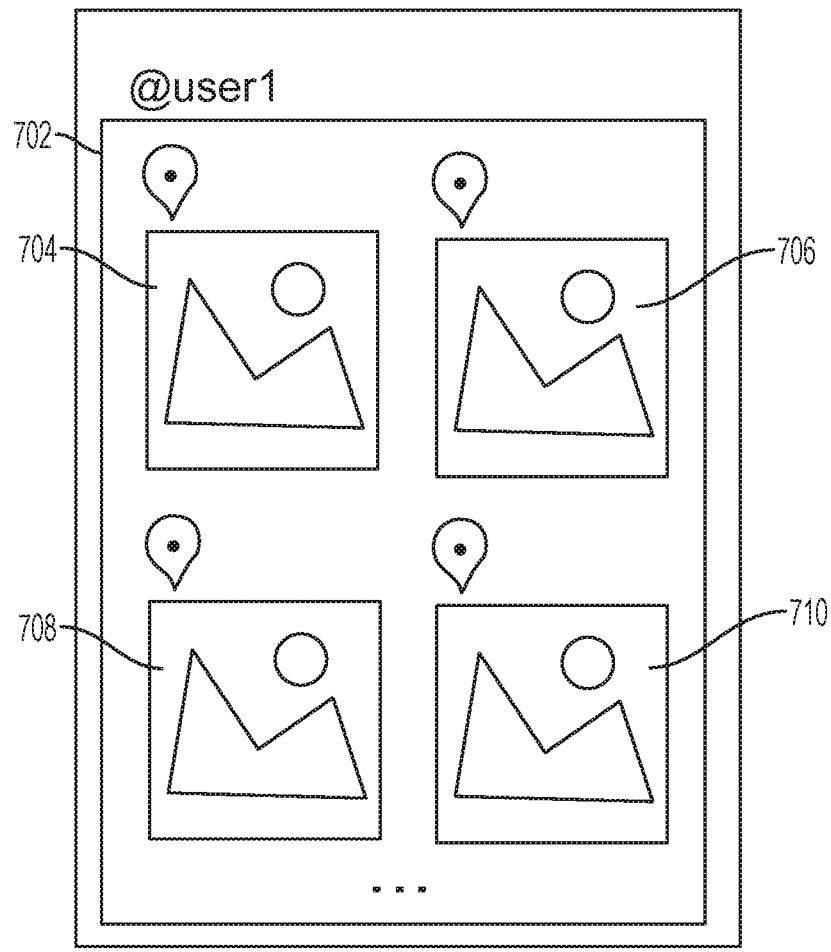
FIG. 7 is an illustration of demographic data of a user who made a comment to the post of FIG. 3 in accordance with an aspect of the present disclosure.

With reference now to FIG. 7, demographic data 702 about a user who posted a comment, e.g., @user 1, may be inferred in response to the user posting a comment 304 for the post of image 302. In some aspects, for example, demographic information for user @user1, e.g., demographics 704, 706, 708, and 710 may be inferred by computing system 110. For example, the user's location may be estimated based on geo-reference locations at the user's posts, user demographics, may be estimated by analyzing the user's profile, profile pictures, or pictures where the user is tagged, using deep learning, Gabor filters, Local Binary Patterns (LBP) descriptors, or other similar methods.

Figure 8:
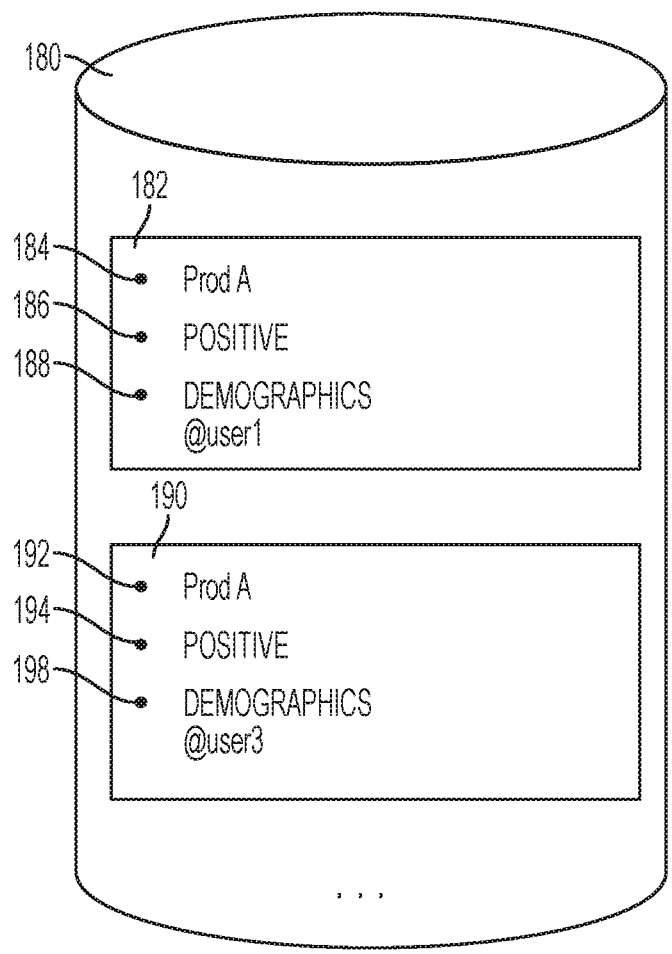
FIG. 8 is an illustration of a database storing product identification and text analysis results in accordance with an aspect of the present disclosure.

With reference again to FIGS. 2 and 8, at 226, computing system 110 may gather the results together, e.g., the identification of the product 318 as product A, the result of the sentiment analysis for each user, e.g., positive for @user1 and positive for @user 3, and the demographics for each user and may store the results in results database 180 at 228. For example, with reference to FIG. 8, a result 182 may include an identification of the product 184, e.g., "prod A", a sentiment 186, e.g., "positive", and demographics for a user 188, e.g., demographics for @user1. Likewise, a result 190 may include an identification of the product 192, e.g., "prod A", a sentiment 194, e.g., "positive", "negative", and any associated text about the product that may indicate why the sentiment is "positive" or "negative", and demographics for a user 196, e.g., demographics for @user3. Other similar results may be stored in results database 180.

In some aspects, for example, the results stored in results database 180 may be utilized to perform a variety of functions. For example, the results may be analyzed to determine successful characteristics of a product that was published implicitly in social media, e.g., based on the content of the comments and the corresponding sentiment. For example, the results may be analyzed to determine that a particular feature on a product is desirable to users and may add that feature to other similar products.

In some aspects, the results stored in results database 180 may be analyzed to determine which features of a product need enhancement. For example, the results may be analyzed to determine that the results include users who have a negative sentiment with respect to at least one feature of the product either because the feature does not function as desired by the users or because the product is simply missing a feature desired by the users. The product may then be modified to update the feature that is not functioning as desired or add the new feature that is desired by the users.

In some aspects, the results stored in database 180 may be utilized to optimize advertising strategies. For example, the results may be analyzed to determine the demographics of users posting positive comments about a product and advertisement may then be focused on other users having similar demographics. In another example, the results may be analyzed to determine the demographics of users posting negative reviews of a product and advertisements to users having similar demographics to those posting negative reviews may be reduced. In another example, the advertising may be improved or increase to users who have demographics similar to those posting negative reviews when a new version of the product has been released that includes updated features addressing the content of the negative reviews.

In some aspects, the results stored in database 180 may be leveraged to compare product performance to competitor products of the same product entity type. In some aspects, for example, results database 180 may contain all the positive and negative impressions regarding a product and all the positive and negative impressions regarding the products of a competitor. As an example, the retailer may discover which features are being criticized on their products, and check if the same features are receiving a negative feedback on the product from the competitor by accessing database 180. In some aspects, for example, the retailer may determine which features have received positive reviews for a competitor's product and such features may be assessed for incorporation into a new or revised product.

In some aspects, for example, the results stored in results database 180 may be manually analyzed by the retailer or a social media analyst to determine if the product is receiving positive/negative feedback, which features of the product are receiving positive/negative feedback, the profiles of users posting positive feedback, the profile of users posting negative feedback, the comparison of feedbacks between their products and competitors' products, or other similar determinations. These determinations may then be used by the retailer to modify or update products, or advertisements.

Figure 9:
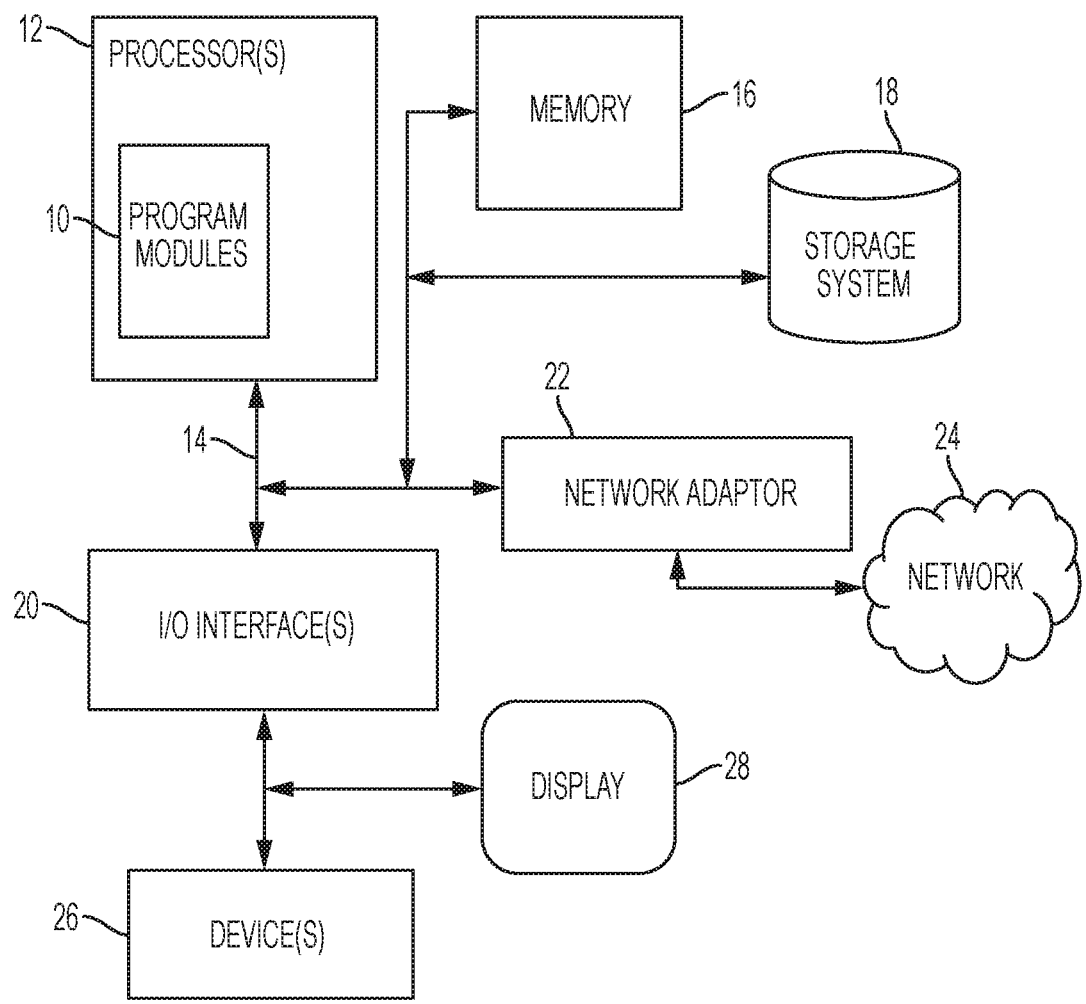
FIG. 9 is an exemplary block diagram of a computer system in which processes involved in the system, method, and computer program product described herein may be implemented.

FIG. 9 illustrates a schematic of an example computer or processing system that may implement any portion of system 100, computing system 110, server 130, databases 150, 160, 170, and 180, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable user electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
   receiving social network data from at least one social network, the social network data comprising at least one post by a user of the at least one social network;
   determining that the at least one post by the user includes an image;
   in response to determining that the at least one post by the user includes an image, retrieving, from the social network data, at least one comment posted in response to the at least one post by the user;
   processing text of the at least one comment to determine whether the text contains a reference to a product entity;
   determining, based on the processing, that the text contains a reference to a product entity, wherein the text of the at least one comment does not identify product entity name and brand of the product;
   identifying a type of the product entity referenced by the text;
   analyzing the image based on the identified type of the product entity by analyzing a search space defined to likely contain the identified product entity type, wherein the search space is defined by an image processing criterion associated with the type of the product entity, the image processing criterion specifying at least a location within the image to be searched for the product entity, the image processing criterion determined from an images database storing image processing criteria for product entities, which define a particular portion for detecting a particular product, the particular portion including a body part where the particular product can be worn, wherein the image has no identifying text associated with the product entity;
   determining that an image of a product of the identified type is present in the image based on the analysis of the image;
   comparing the image of the product of the identified type to a plurality of images of products stored in a products database;
   determining, based on a result of the comparison, that the image of the product of the identified type corresponds to one of the plurality of images of products stored in the products database;
   identifying the product based on the determination that the image of the product of the identified type corresponds to one of the plurality of images of products stored in the products database; and
   storing an identification of the product in a results database.

2. The method of claim 1, further comprising:
   processing the text of the at least one comment to determine a sentiment of the text; and
   associating the determined sentiment of the text with the identification of the product; and
   storing the determined sentiment of the text with the identification of the product in the results database.

3. The method of claim 1, wherein analyzing the image based on the identified type of the product entity comprises:
   receiving from an images database, based on the identified type of the product entity, at least one image processing criterion for analyzing the image; and
   applying the at least one image processing criterion to the image.

4. The method of claim 3, wherein the at least one image processing criterion defines at least a region to be searched in the image for a product of the identified type.

5. The method of claim 1, further comprising:
   determining, based on the social network data, demographic data of a user that posted the at least one comment;
   associating the determined demographic data with the identification of the product; and
   storing the determined demographic data with the identification of the product in the results database.

6. The method of claim 1, wherein the results database includes a plurality of results, each result comprising:
   the identification of the product;
   a determined sentiment of the text of the at least one comment; and
   demographic data of a user that posted the at least one comment.

7. The method of claim 1, wherein:
   determining, based on the processing, that the text contains a reference to a product entity comprises comparing the text of the at least one comment to text corresponding to a plurality of product entity types stored in a database; and
   identifying a type of the product entity referenced by the text comprises determining based on the comparison that the text of the at least one comment matches the text corresponding to one of the plurality of product entity types stored in the database.

* * * * *